United States Patent
Khankal et al.

(10) Patent No.: US 12,203,701 B2
(45) Date of Patent: Jan. 21, 2025

(54) EMISSION FREE FLUFF TRANSFER SYSTEM AND INTEGRATED NITROGEN CYCLE

(71) Applicant: Chevron Phillips Chemical Company LP, The Woodlands, TX (US)

(72) Inventors: Reza Khankal, Bellaire, TX (US); Enrique Mancillas, Houston, TX (US); Kamaljeet Kaur, Katy, TX (US); Hetian Li, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/368,752

(22) Filed: Sep. 15, 2023

(65) Prior Publication Data

US 2024/0003621 A1    Jan. 4, 2024

Related U.S. Application Data (63) Continuation of application No. 17/964,487, filed on Oct. 12, 2022, now Pat. No. 11,815,310, which is a continuation of application No. 17/511,169, filed on Oct. 26, 2021, now Pat. No. 11,549,748.

(51) Int. Cl.
| | | |
|---|---|---|
| C08F 6/00 | (2006.01) | |
| B01D 45/16 | (2006.01) | |
| B65G 53/60 | (2006.01) | |
| F26B 3/02 | (2006.01) | |

(52) U.S. Cl.
CPC ............. *F26B 3/02* (2013.01); *B01D 45/16* (2013.01); *B65G 53/60* (2013.01)

(58) Field of Classification Search
None
See application file for complete search history.

(56) References Cited

U.S. PATENT DOCUMENTS

| | | | | |
|---|---|---|---|---|
| 2,666,269 | A * | 1/1954 | Parry | F26B 3/08 201/31 |
| 2,912,768 | A * | 11/1959 | Huston | F26B 17/103 34/592 |
| 3,772,262 | A * | 11/1973 | Clementi | C08C 2/06 159/DIG. 10 |
| 3,816,383 | A * | 6/1974 | Stotko | B01J 19/1881 526/67 |

(Continued)

*Primary Examiner* — Joseph A Dillon, Jr.
(74) *Attorney, Agent, or Firm* — Conley Rose, P.C.

(57) ABSTRACT

A hydrocarbon recovery system is integrated with a fluff transfer system. The hydrocarbon recovery system is configured for contacting a wet polymer fluff with a purge gas to provide a purged polymer fluff and an overhead stream, and separating a solids stream, a recovered hydrocarbon stream, and a recovered purge gas from the overhead stream. The polymer fluff transfer system is configured to receive the purged polymer fluff from the hydrocarbon recovery system and transport the purged polymer fluff in the fluff transfer system via circulation of a fluff transfer gas. The hydrocarbon recovery system and the fluff transfer system are integrated by utilizing at least a portion of the recovered purge gas from the hydrocarbon recovery system in the fluff transfer system as the fluff transfer gas and optionally utilizing fluff transfer gas from the fluff transfer system as the purge gas in the hydrocarbon recovery system.

20 Claims, 4 Drawing Sheets

(56) References Cited

U.S. PATENT DOCUMENTS

| | | | | |
|---|---|---|---|---|
| 3,869,807 A * | 3/1975 | Perry | F26B 25/008 | 34/500 |
| 4,153,427 A * | 5/1979 | Bissett | C10J 3/00 | 406/197 |
| 4,305,210 A * | 12/1981 | Christensen | B01J 8/36 | 406/75 |
| 4,424,341 A * | 1/1984 | Hanson | B01D 3/06 | 528/503 |
| 4,497,120 A * | 2/1985 | Laemmermann | F26B 25/002 | 406/122 |
| 4,674,290 A * | 6/1987 | Verser | F17C 13/025 | 62/51.1 |
| 5,183,866 A * | 2/1993 | Hottovy | B01J 8/005 | 526/88 |
| 5,314,579 A * | 5/1994 | Sung | B01J 8/005 | 159/DIG. 10 |
| 5,430,233 A * | 7/1995 | Forrester | A62D 3/33 | 588/256 |
| 5,455,314 A * | 10/1995 | Burns | G05B 9/03 | 526/64 |
| 5,489,166 A * | 2/1996 | Schmit | C21B 7/22 | 406/137 |
| 5,565,174 A * | 10/1996 | Burns | C08F 10/00 | 422/131 |
| 5,624,877 A * | 4/1997 | Bergmeister | C08F 210/16 | 526/119 |
| 5,685,640 A * | 11/1997 | Goedicke | B01F 35/71 | 34/364 |
| 6,005,061 A * | 12/1999 | Geerts | C08F 10/00 | 526/132 |
| 6,045,661 A * | 4/2000 | Kreischer | B01D 3/06 | 526/348 |
| 6,051,632 A * | 4/2000 | Schrader | C09D 163/00 | 525/507 |
| 6,114,501 A * | 9/2000 | Hottovy | C08F 6/003 | 210/806 |
| 6,204,344 B1 * | 3/2001 | Kendrick | B01J 19/1837 | 528/480 |
| 6,239,235 B1 * | 5/2001 | Hottovy | B01J 4/008 | 526/348 |
| 6,262,191 B1 * | 7/2001 | Hottovy | B01J 8/005 | 526/64 |
| 6,420,497 B1 * | 7/2002 | Kufeld | C08F 210/16 | 522/132 |
| 6,926,868 B2 * | 8/2005 | Kendrick | B01J 19/0053 | 526/71 |
| 6,953,553 B2 * | 10/2005 | Reid | B01J 8/007 | 526/64 |
| 7,033,545 B2 * | 4/2006 | Kufeld | C08F 10/00 | 422/135 |
| 7,109,290 B2 * | 9/2006 | McElvain | B01J 8/0015 | 526/64 |
| 7,378,472 B2 * | 5/2008 | Fell | C08F 297/08 | 526/348 |
| 7,517,947 B2 * | 4/2009 | McElvain | B01J 19/2435 | 526/64 |
| 7,524,904 B2 * | 4/2009 | Verser | C08F 6/003 | 526/918 |
| 7,745,568 B2 * | 6/2010 | Vandaele | B01J 8/20 | 422/255 |
| 7,790,840 B2 * | 9/2010 | DeBruin | B29B 9/06 | 528/480 |
| 7,957,947 B2 * | 6/2011 | Odi | B29B 7/845 | 585/326 |
| 7,999,044 B2 * | 8/2011 | Hottovy | B01J 19/1837 | 422/138 |
| 8,249,748 B2 * | 8/2012 | Odi | B29B 7/748 | 585/326 |
| 8,367,782 B2 * | 2/2013 | Marissal | B01J 19/2415 | 526/64 |
| 8,543,242 B2 * | 9/2013 | Odi | C08F 6/003 | 700/266 |
| 9,302,244 B2 * | 4/2016 | Hottovy | B01J 19/1837 | |
| 9,394,383 B2 * | 7/2016 | Gupta | B01J 19/245 | |
| 9,610,558 B2 * | 4/2017 | McElvain | C08F 10/00 | |
| 9,932,422 B2 * | 4/2018 | Hottovy | C08F 6/003 | |
| 9,963,523 B2 * | 5/2018 | Bhandarkar | B01J 19/06 | |
| 10,046,501 B2 * | 8/2018 | Hwang | B29C 48/37 | |
| 10,301,404 B2 * | 5/2019 | Hottovy | B01D 1/04 | |
| 10,774,161 B2 * | 9/2020 | Dooley | C08F 6/006 | |
| 10,792,609 B2 * | 10/2020 | Ji | B01J 20/3433 | |
| 11,021,549 B2 * | 6/2021 | Curren | B01J 19/0053 | |
| 11,058,987 B2 * | 7/2021 | Ji | C07C 9/12 | |
| 11,312,797 B2 * | 4/2022 | Dooley | C08F 10/02 | |
| 11,578,145 B2 * | 2/2023 | Curren | B01J 19/0053 | |
| 11,623,176 B2 * | 4/2023 | Ji | C08F 10/02 | 95/98 |
| 11,673,975 B2 * | 6/2023 | Price | B01J 19/2435 | 526/64 |
| 12,091,264 B2 * | 9/2024 | Thomas | B65G 53/24 | |
| 12,098,068 B2 * | 9/2024 | Thomas | B01D 46/71 | |
| 2003/0000103 A1 * | 1/2003 | Fabbri | B01D 29/01 | 34/576 |
| 2003/0121172 A1 * | 7/2003 | Kay | F26B 17/1408 | 34/577 |
| 2004/0136882 A1 * | 7/2004 | Verser | B01J 8/222 | 422/131 |
| 2005/0272914 A1 * | 12/2005 | McElvain | B01J 19/2435 | 528/480 |
| 2006/0287442 A1 * | 12/2006 | McElvain | B01J 19/2435 | 526/64 |
| 2008/0052058 A1 * | 2/2008 | Odi | B29B 7/845 | 703/12 |
| 2010/0056707 A1 * | 3/2010 | Hottovy | B01J 4/008 | 422/138 |
| 2011/0201765 A1 * | 8/2011 | Odi | B29B 7/94 | 526/348 |
| 2012/0282144 A1 * | 11/2012 | Odi | B29B 9/065 | 422/310 |
| 2014/0136882 A1 * | 5/2014 | Kumagai | G06F 11/1438 | 711/112 |
| 2014/0171611 A1 * | 6/2014 | Nyfors | B01J 8/003 | 422/131 |
| 2014/0264991 A1 * | 9/2014 | Hwang | B29C 48/37 | 425/149 |
| 2016/0264693 A1 * | 9/2016 | Hottovy | B01J 19/1837 | |
| 2017/0081436 A1 * | 3/2017 | Bhandarkar | B01J 19/2455 | |
| 2018/0169563 A1 * | 6/2018 | Ji | B01D 53/002 | |

\* cited by examiner

EMISSION FREE FLUFF TRANSFER SYSTEM AND INTEGRATED NITROGEN CYCLE

CROSS-REFERENCE TO RELATED APPLICATIONS

The present application is a continuation of and claims priority to U.S. patent application Ser. No. 17/964,487 filed Oct. 12, 2022, published as U.S. Patent Application Publication No. 2023/0127887 A1, which is a continuation of and claims priority to U.S. patent application Ser. No. 17/511,169 filed Oct. 26, 2021, now U.S. Pat. No. 11,549,748, both entitled "Emission Free Fluff Transfer System and Integrated Nitrogen Cycle," both of which are hereby incorporated by reference in their entirety.

STATEMENT REGARDING FEDERALLY SPONSORED RESEARCH OR DEVELOPMENT

Not applicable.

TECHNICAL FIELD

The present disclosure relates to systems and methods for polymer production; more specifically, the present disclosure relates to hydrocarbon recovery and fluff transfer at a polymer (e.g., polyethylene (PE) or polypropylene (PP)) production plant; still more specifically, the present disclosure relates to hydrocarbon recovery and fluff transfer systems and methods that reduce (e.g., minimize) plant hydrocarbon emissions and transport gas (e.g., nitrogen) loss.

BACKGROUND

A need exists for systems and methods for reducing hydrocarbon emissions from polymer production plants and for reducing an amount of polymer transport gas (e.g., nitrogen) utilized to transport polymer that would otherwise be vented (at least in part) to the atmosphere by way of a flare.

SUMMARY

Herein disclosed is a hydrocarbon recovery system comprising: a purge column; a separator; a purge gas-hydrocarbon recovery unit; and a waste gas outlet line, wherein the purge column is configured for contact of wet polymer fluff with a purge gas, and comprises a wet polymer fluff inlet, a gas outlet for an overhead stream comprising the purge gas and entrained polymer fluff, a fluff outlet for a purged polymer fluff, and one or more purge gas inlets for the purge gas, wherein the separator is fluidly connected with the gas outlet of the purge column and is configured to separate solids comprising recovered polymer fluff from a separator gas outlet stream comprising the purge gas and hydrocarbon, wherein the purge gas-hydrocarbon recovery unit is fluidly connected with the separator and is configured to separate the separator gas outlet stream into a recovered hydrocarbon stream and a recovered purge gas stream, and wherein the hydrocarbon recovery system is integrated with a fluff transfer system configured for transporting the purged polymer fluff via circulation of a fluff transfer gas, (a) wherein the hydrocarbon recovery system is integrated with the fluff transfer system such that a portion of the fluff transfer gas in the fluff transfer system is introduced into the purge column as at least a portion of the purge gas, and/or (b) wherein the hydrocarbon recovery system is integrated with the fluff transfer system such that at least a portion of the recovered purge gas in the recovered purge gas stream is introduced into the fluff transfer system as the fluff transfer gas.

Also disclosed herein is a fluff transfer system configured for transporting a purged polymer fluff from a purge column via circulation of a fluff transfer gas, the fluff transfer system comprising: a fluff transfer blower configured to pressurize the fluff transfer gas and provide a pressurized fluff transfer gas in a fluff transfer blower outlet line, and an extruder feed tank fluidly connected with the fluff transfer blower via the fluff transfer blower outlet line and fluidly connected with the purge column via the fluff outlet, wherein the extruder feed tank comprises an extruder feed tank fluff outlet line and an extruder feed tank fluff transfer gas outlet line, wherein the extruder feed tank fluff transfer gas outlet line is fluidly connected with the fluff transfer blower via a fluff transfer gas circulation line, wherein the fluff transfer system is integrated with a hydrocarbon recovery system, wherein the hydrocarbon recovery system comprises the purge column and is configured for contact of wet polymer fluff with the purge gas to provide the purged polymer fluff, (a) wherein the fluff transfer system is integrated with the hydrocarbon recovery system such that at least a portion of a recovered purge gas from the hydrocarbon recovery system is introduced into the fluff transfer system as the fluff transfer gas; and/or (b) wherein the fluff transfer system is integrated with the hydrocarbon recovery system such that a portion of the fluff transfer gas is introduced into the purge column as at least a portion of the purge gas.

Further disclosed herein is a hydrocarbon recovery system integrated with a fluff transfer system, wherein the hydrocarbon recovery system is configured for contacting a wet polymer fluff with a purge gas to provide a purged polymer fluff and an overhead stream comprising the purge gas and entrained polymer fluff; and separating a recovered solids stream comprising the entrained polymer fluff, a recovered hydrocarbon stream, and a recovered purge gas from the overhead stream; wherein the polymer fluff transfer system is configured to receive the purged polymer fluff from the hydrocarbon recovery system and transport the purged polymer fluff in the fluff transfer system via circulation of a fluff transfer gas; and (a) wherein the hydrocarbon recovery system and the fluff transfer system are integrated by utilizing fluff transfer gas from the fluff transfer system as the purge gas in the hydrocarbon recovery system; and/or (b) wherein the hydrocarbon recovery system and the fluff transfer system are integrated by utilizing at least a portion of the recovered purge gas from the hydrocarbon recovery system in the fluff transfer system as the fluff transfer gas.

BRIEF DESCRIPTION OF THE DRAWINGS

The detailed description will reference the drawings briefly described below, wherein like reference numerals represent like parts, unless otherwise indicated.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

In some polymer production plants (e.g., polyethylene (PE) or polypropylene (PP) production plants, such as PE production plants having at least one slurry loop), the hydrocarbon recovery system and the fluff transfer system are two systems that utilize gas (e.g., nitrogen). Both the hydrocarbon recovery system and fluff transfer system utilize purge (e.g., removable of undesirables via a waste gas to, for example, flare) and make-up gas (e.g., input of fresh gas) to avoid accumulating hydrocarbons and achieve steady state operations. Conventionally, the two systems (i.e., the hydrocarbon recovery system and fluff transfer system) are independent of each other and are connected via a purge column rotary valve through which polymer fluff enters the fluff transfer system from the bottom of a purge column of the hydrocarbon recovery system and some gas (e.g., nitrogen) leaks the opposite way, back to the hydrocarbon recovery system.

Figure 1:
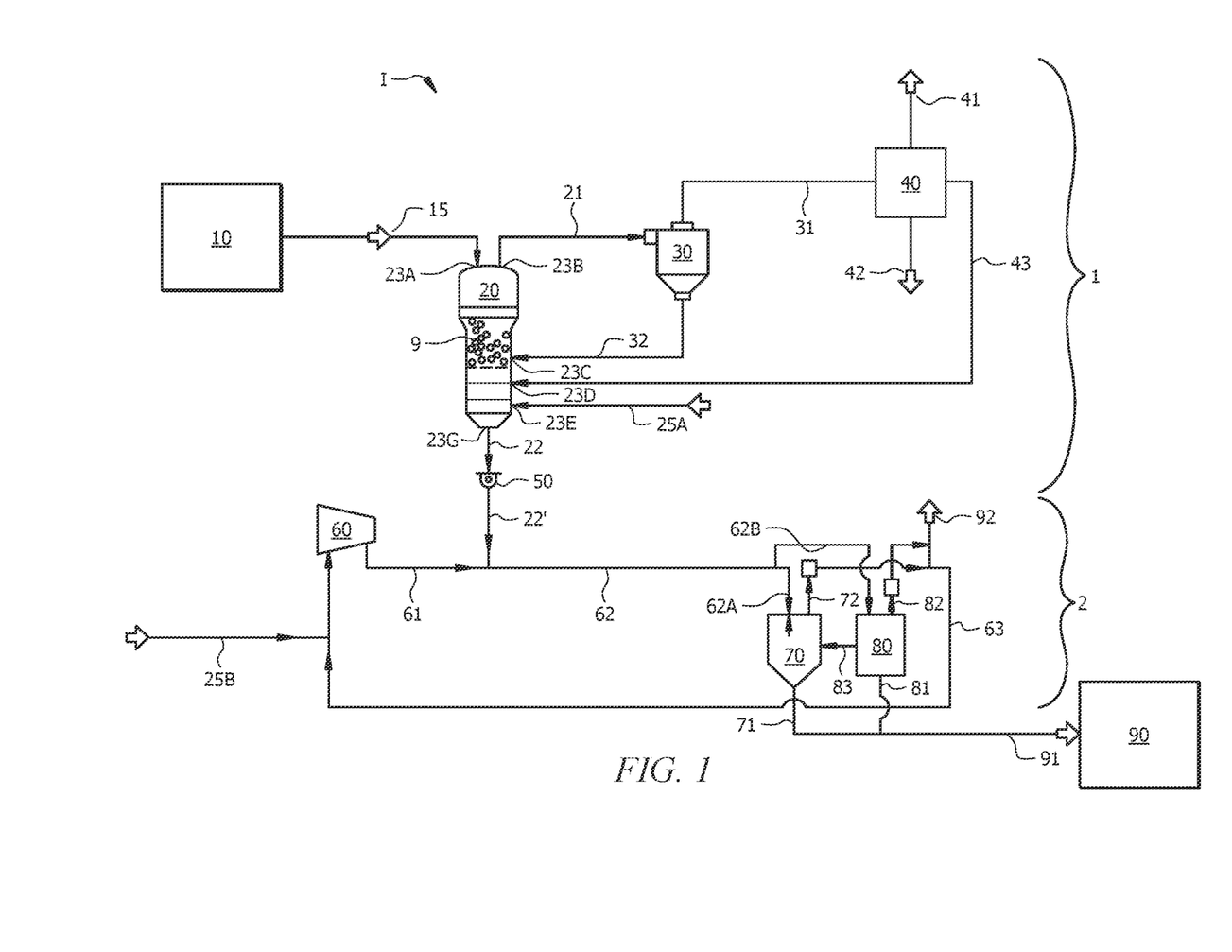
FIG. 1 illustrates an exemplary schematic of a non-integrated hydrocarbon recovery and fluff transfer system.

FIG. 1 is a schematic of a non-integrated hydrocarbon recovery and fluff transfer system I in accordance with aspects of the present disclosure, depicting the hydrocarbon recovery system 1 and fluff transfer system 2 in a conventional, non-integrated polymer production plant. The hydrocarbon recovery system 1 (also referred to herein simply as "recovery system") comprises a purge column 20, and a purge gas-hydrocarbon recovery unit 40, such as an isobutane nitrogen recovery unit (INRU). In purge column 20, wet polymer fluff 9 can be purged with a purge gas (e.g., by nitrogen), which is utilized to strip the wet polymer fluff of hydrocarbons, at two distribution levels in the purge column 20 to remove the volatile organic compounds (VOCs). Purge column vent gas flows to the purge gas-hydrocarbon recovery unit 40 after passing through filters/cyclones (e.g., separator(s) 30), such as cyclone 30 depicted in FIG. 1, to remove any solids in the stream. The purge gas-hydrocarbon recovery unit 40 is operable to recover hydrocarbons from the purge column overhead vapor stream and to recover a gas stream (e.g., a nitrogen stream) suitable to be recycled to the purge column 20.

As illustrated in FIG. 1, fluff transfer system 2 comprises a fluff transfer blower 60, a fluff silo 80, and an extruder feed tank 70. The fluff transfer system 2 is designed to transport fluff from the purge column 20 to the extruder feed tank 70 using the transfer gas (e.g., nitrogen). The transfer gas stream circulating in the fluff transfer system 2 (a closed loop 68 comprising fluff transfer blower outlet line 61, second portion fluff transfer blower outlet line 61B, fluff transfer line 62, and fluff transfer gas circulation line 63), picks up residual hydrocarbons in the fluff. This circulating fluff transfer gas is conventionally purged via a purge gas outlet line 92 and replaced by fresh transfer gas continuously (e.g., via make-up/fresh transfer gas line 25B) to avoid a buildup of a high concentrations of VOCs in the loop of the fluff transfer system 2.

Purged gas removed from fluff transfer system 2 (e.g., via fluff transfer gas purge line 92) can be a significant source of VOC emissions (and loss of purge gas, e.g., nitrogen) in the polymer production plant I as the plant sizes increase. The trend toward more restricted environmental regulations in recent years has made the operation of hydrocarbon recovery and fluff transfer system I more challenging. Additionally, undesired leak from fluff transfer system 2 to the bottom of purge column 20 (e.g., through the rotary valve 50) due to a pressure difference between the hydrocarbon recovery system 1 and fluff transfer system 2 remains a challenging problem in operation and design.

Figure 2:
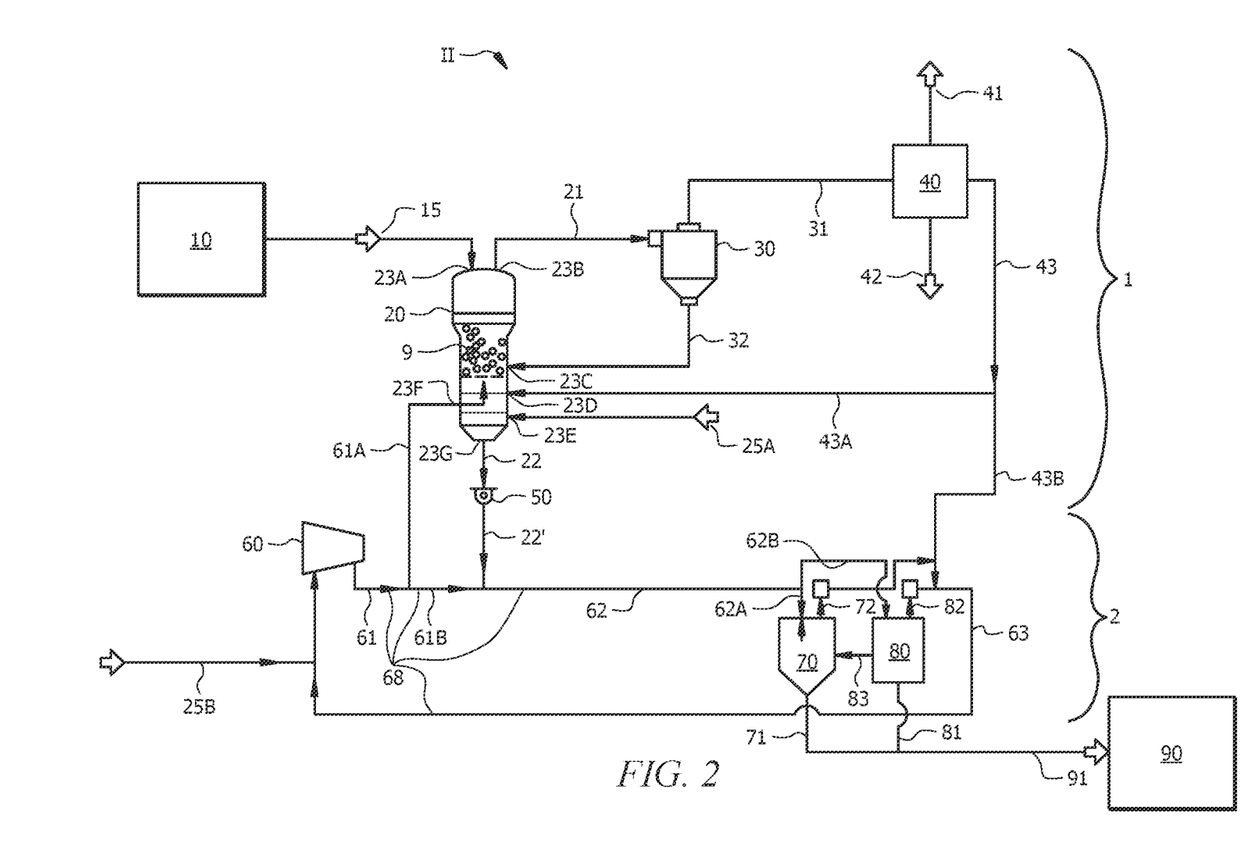
FIG. 2 illustrates an exemplary schematic of an integrated hydrocarbon recovery and fluff transfer system, according to embodiments of this disclosure.

Herein disclosed is an integrated hydrocarbon recovery and fluff transfer system. FIG. 2 is a schematic of an integrated hydrocarbon recovery and fluff transfer system II, according to embodiments of this disclosure. Integrated hydrocarbon recovery and fluff transfer system II comprises hydrocarbon recovery system 1 integrated with fluff transfer system 2. Hydrocarbon recovery system 1 comprises: purge column 20, separator 30, purge gas-hydrocarbon recovery unit 40, and waste gas outlet line 41.

Purge column 20 is configured for contact of wet polymer fluff with a purge gas, whereby hydrocarbons are stripped/removed from the polymer fluff. Purge column 20 comprises a wet polymer fluff inlet 23A, a gas outlet 23B, a fluff outlet 23G and one or more purge gas inlets 23D, 23E, 23F for the purge gas. As utilized herein, the purge gas is a gas utilized to strip the hydrocarbons from the polymer fluff. A purge column fluff inlet line 15 can fluidly connect purge column fluff inlet 23A of purge column 20 with upstream apparatus 10, whereby wet polymer fluff can be introduced into purge column 20. In embodiments, the wet polymer fluff is introduced into a top portion of purge column 20.

Separator 30 is fluidly connected with gas outlet 23B of purge column 20, which can be located at a top of purge column 20, via separator inlet line 21. Separator 30 is configured to separate solids comprising recovered polymer fluff from a separator gas outlet stream 31 comprising the purge gas and purged/recovered hydrocarbons. A separator solids outlet line 32 can fluidly connect separator 30 with a separated/recovered solids inlet 23C of purge column 20, whereby separated solids can be reintroduced into purge column 20.

Purge gas-hydrocarbon recovery unit 40 is fluidly connected with separator 30 via separator gas outlet line 31 and is configured to separate the separator gas outlet stream in separator gas outlet line 31 into a recovered hydrocarbon stream 42 and a recovered purge gas stream 43, and optionally a waste gas that can be removed from purge gas-hydrocarbon recovery unit 40 via purge gas-hydrocarbon recovery unit waste gas outlet line 41. As described further hereinbelow, recovered purge gas stream 43 can be fluidly connected (e.g., via first portion recovered purge gas line 43A and purge column recovered purge gas inlet 23D) with purge column, for introduction of recovered purge gas in recovered purge gas line 43 into purge column 20. Alternatively or additionally, recovered purge gas stream 43 can be fluidly connected (e.g., via second portion recovered purge gas line 43B) with fluff transfer system 2, for introduction of recovered purge gas in recovered purge gas line 43 into fluff transfer system 2.

Fluff transfer system 2 comprises: a fluff transfer blower 60 configured to pressurize a fluff transfer gas and provide a pressurized fluff transfer gas in a fluff transfer blower outlet line 61, and an extruder feed tank 70 fluidly connected with the fluff transfer blower 60 via the fluff transfer blower outlet line 61 and fluidly connected with purge column 20 via fluff outlet 23G, a purge column fluff outlet line 22, and rotary valve 50.

Extruder feed tank 70 comprises an extruder feed tank fluff outlet line 71 and an extruder feed tank fluff transfer gas outlet line 72. Extruder feed tank fluff transfer gas outlet line 72 is fluidly connected with fluff transfer blower 60 via a fluff transfer gas circulation line 63.

According to this disclosure, hydrocarbon recovery system 1 is integrated with fluff transfer system 2. In embodiments, hydrocarbon recovery system 1 is integrated with fluff transfer system 2 via a purge column fluff transfer gas inlet line 61A fluidly connecting at least one of the one or more purge gas inlets 23D, 23E, 23F of purge column 20 with fluff transfer blower outlet line 61, whereby a portion of the fluff transfer gas in fluff transfer blower outlet line 61 is introduced into purge column 20 as at least a portion of the purge gas.

Alternatively or additionally, hydrocarbon recovery system 1 can be integrated with fluff transfer system 2 via a fluff transfer system recovered purge gas line 43B fluidly connecting the purge gas-hydrocarbon recovery unit 40 with fluff transfer system 2, whereby at least a portion of the recovered purge gas in the recovered purge gas stream 43 can be introduced into fluff transfer system 2 as the fluff transfer gas.

In embodiments, such as the embodiment of FIG. 2, waste gas outlet line 41 is connected to the purge gas-hydrocarbon recovery unit 40. Alternatively or additionally, a waste gas outlet line 41 can be located elsewhere in hydrocarbon recovery system 1. Waste gas outline (which can be considered a "purge" line for the elimination of unwanted gas from hydrocarbon recovery system 1) is utilized to prevent buildup of unwanted components in hydrocarbon recovery system 1. For clarity, "purge gas" is utilized herein to indicate the gas introduced into purge column 20 to strip hydrocarbons from the polymer fluff, while "waste gas" is utilized to indicate the gas removed from hydrocarbon recovery system 1 to prevent buildup of unwanted components.

In embodiments, such as the embodiment of FIG. 2, a hydrocarbon recovery and fluff transfer system of this disclosure comprises no gas outlet line from fluff transfer system 2 other than the purge column fluff transfer gas inlet line 61A.

The hydrocarbon recovery and fluff transfer system of this disclosure can further comprise one or more fresh (or "make-up") purge gas inlet lines 25A and/or fresh (or "make-up") fluff transfer gas inlet lines 25B. For example, hydrocarbon recovery and fluff transfer system II of FIG. 2 can comprise a fresh or make-up purge gas inlet line 25A fluidly connected with purge column 20 via at least one of the one or more purge gas inlets 23D, 23E, 23F, with a fresh/make-up purge gas inlet line 25A connected with purge gas inlet 23E of FIG. 2. As depicted in the embodiment of FIG. 2, a fresh fluff transfer gas inlet line 25B can be fluidly connected with the fluff transfer system 2. In the embodiment of FIG. 2, a fresh fluff transfer gas inlet line 25B is fluidly connected with fluff transfer gas circulation line 63, but the or another fresh fluff transfer gas inlet line 25B can be located elsewhere within fluff transfer system 2.

In embodiments, the purge gas (e.g., fresh or make-up purge gas introduced via make-up/fresh purge gas line 25A) can comprise or consist primarily of (e.g., comprise greater than or equal to about 50, 60, 70, 80, 90, 95 vol %) of nitrogen. In embodiments, the hydrocarbon recovered via hydrocarbon recovery system 1 can comprise or consist primarily of isobutane. In embodiments, the purge gas comprises nitrogen and the hydrocarbon comprises isobutane.

Hydrocarbon recovery and fluff transfer system II can further comprise upstream apparatus 10 operable to provide wet polymer fluff to the purge column 20, for example, via purge column fluff inlet line 15. Any upstream apparatus known to be suitable for the production of wet polymer fluff (e.g., wet PE fluff). Upstream apparatus 10 can comprise one or more polymerization reactors, one or more flash systems (e.g., flashline heaters, flash columns) or a combination thereof. In embodiments, the one or more polymerization reactors include one or more slurry loop reactors.

Hydrocarbon recovery and fluff transfer system H can further include downstream apparatus 90. Downstream apparatus 90 can comprise an extruder. In embodiments, fluff silo 80 can be utilized to store fluff for introduction to downstream apparatus (e.g., extruder) 90. A line 83 can introduce fluff from fluff silo 80 to extruder feed tank 70, prior to introduction into downstream apparatus 90. Purge column 20 is fluidly connected with fluff transfer system 2 via purge column fluff outlet line 22, rotary valve 50, and rotary valve fluff outlet line 22'. In embodiments, purge column 20 is fluidly connected with fluff transfer system 2 downstream of fluff transfer blower and upstream of extruder feed tank 70 and/or fluff silo 80. For example, as depicted in the embodiment of FIG. 2, rotary valve fluff outlet line 22' introduced purged fluff from purge column 20 into fluff transfer line 62. Fluff transfer line 63 can introduce purged polymer fluff into extruder feed tank 70 and/or fluff silo 80, via extruder feed tank fluff inlet line 62A and fluff silo fluff inlet line 62B, respectively. An extruder feed tank fluff outlet line 71 and a fluff silo fluff outlet line 81 can fluidly connect extruder feed tank 70 and fluff silo 80 with downstream apparatus 90, for example, via downstream apparatus transferred fluff inlet line 91. An extruder feed tank transfer gas outlet line 72 and a fluff silo transfer gas outlet line 82 can fluidly connect extruder feed tank 70 and fluff silo 80, respectively, with circulating transfer gas in transfer gas loop comprising fluff transfer blower outlet line 61, second portion fluff transfer blower outlet line 61B, fluff transfer line 62, and fluff transfer gas circulation line 63. For example, as depicted in the embodiment of FIG. 2, extruder feed tank transfer gas outlet line 72 and fluff silo transfer gas outlet line 82 fluidly connect extruder feed tank 70 and fluff silo 80, respectively, with fluff transfer gas circulation line 63.

In embodiments, a system II of this disclosure comprises: hydrocarbon recovery system 1 integrated with fluff transfer system 2. As described hereinabove, hydrocarbon recovery system 1 can comprise: purge column 20, separator 30, purge gas-hydrocarbon recovery unit 40, and waste gas outlet line 41, and purge column 20 is configured for contact of wet polymer fluff with a purge gas, and comprises wet polymer fluff inlet 23A, gas outlet 23B, fluff outlet 23G and one or more purge gas inlets 23D, 23E, 23F for the purge gas, separator 30 is fluidly connected with gas outlet 23B of purge column 20 and is configured to separate solids comprising recovered polymer fluff from a separator gas outlet stream 31 comprising the purge gas and hydrocarbon, and purge gas-hydrocarbon recovery unit 40 is fluidly connected with separator 30 and is configured to separate the separator gas outlet stream 31 into a recovered hydrocarbon stream 42 and a recovered purge gas stream 43. Also as described hereinabove, fluff transfer system 2 comprises: fluff transfer blower 60 configured to pressurize fluff transfer gas and provide a pressurized fluff transfer gas in fluff transfer blower outlet line 61, and extruder feed tank 70 fluidly connected with fluff transfer blower 60 via fluff transfer blower outlet line 61 and fluidly connected with purge column 20 via fluff outlet 23G, purge column fluff outlet line 22, and rotary valve 50, wherein the extruder feed tank 70 comprises extruder feed tank fluff outlet line 71 and extruder feed tank fluff transfer gas outlet line 72, wherein extruder feed tank fluff transfer gas outlet line 72 is fluidly connected with fluff transfer blower 60 via fluff transfer gas circulation line 63. In embodiments, hydrocarbon recovery system 1 is integrated with fluff transfer system 2 via a fluff transfer system recovered purge gas line 43B fluidly connecting the recovered purge gas-hydrocarbon recovery unit 40 with fluff transfer system 2, whereby at least a portion of the recovered purge gas in the recovered purge gas stream 43 can be introduced into fluff transfer system 2 as the fluff transfer gas.

Alternatively or additionally, hydrocarbon recovery system 1 can be further integrated with fluff transfer system 2 via purge column fluff transfer gas inlet line 61A (also referred to herein as "first portion fluff transfer blower outlet line") fluidly connecting at least one of the one or more purge gas inlets 23D, 23E, 23F of purge column 20 with the fluff transfer blower outlet line 61, whereby a portion of the fluff transfer gas in fluff transfer blower outlet line 61 can be introduced into purge column 20 as at least a portion of the purge gas.

As noted hereinabove, in embodiments, there is no gas outlet line from fluff transfer system 2 other than purge column fluff transfer gas inlet line 61A. The waste gas outlet line 41, purge gas utilized, hydrocarbon(s) recovered, fresh/make-up purge gas or fluff transfer gas inlet lines, upstream apparatus, downstream apparatus, etc. can be as described hereinabove.

Figure 3:
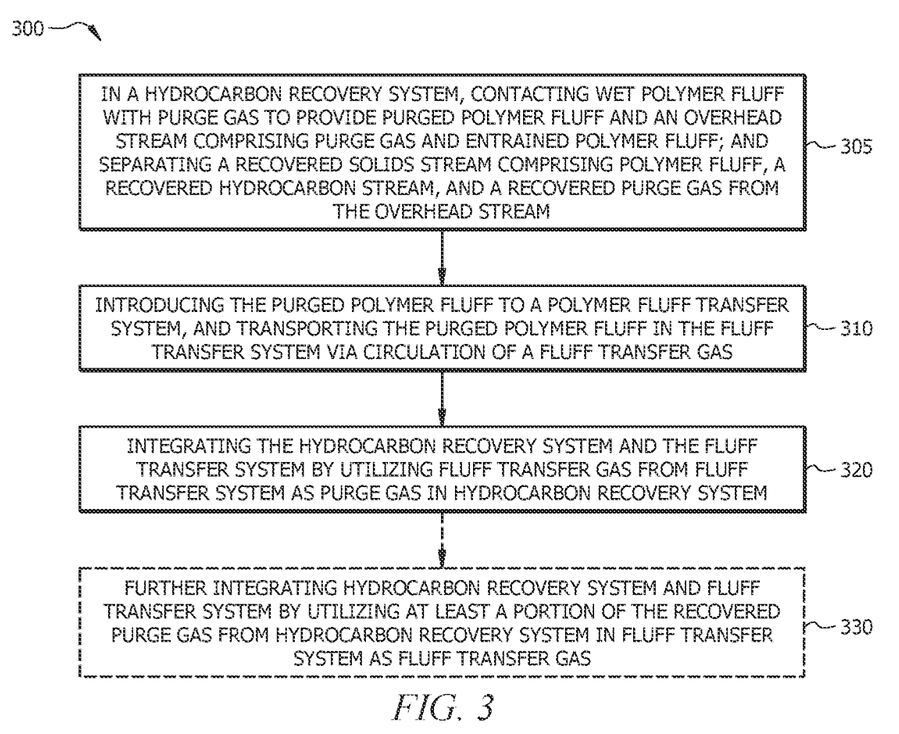
FIG. 3 is a flow diagram of a method, according to embodiments of this disclosure.

A method of hydrocarbon recovery and fluff transfer will now be described with reference to FIG. 3, which is a flow diagram of a method according to embodiments of this disclosure, and FIG. 4, which is a flow diagram of another method according to embodiments of this disclosure. With reference to FIG. 3, a method 300 of this disclosure can comprise: at 305, in a hydrocarbon recovery system 1, contacting wet polymer fluff (e.g., introduced to purge column 20 from upstream apparatus 10 via line 15) with a purge gas to provide a purged polymer fluff and an overhead stream (e.g., in separator inlet line 21) comprising the purge gas and entrained polymer fluff; and separating (e.g., in separator 30 and purge gas-hydrocarbon recovery unit 40)) a recovered solids stream (e.g., in separator solids outlet line 32) comprising the previously entrained polymer fluff, a recovered hydrocarbon stream (in recovered hydrocarbons outlet line 42), and a recovered purge gas (e.g., in recovered purge gas outlet line 43) from the overhead stream. Method 300 further comprises, at 310, introducing the purged polymer fluff from purge column 20 to polymer fluff transfer system 2 (e.g., via purge column fluff outlet line 22, rotary valve 50, and rotary valve fluff outlet line 22'), and transporting the purged polymer fluff in the fluff transfer system 2 via circulation of a fluff transfer gas. Method 300 further comprises, at 320, integrating the hydrocarbon recovery system 1 and the fluff transfer system 2 by utilizing fluff transfer gas from the fluff transfer system 2 (e.g., via fluff transfer blower outlet line 61 or elsewhere in fluff transfer system 2) as the purge gas in the hydrocarbon recovery system 1 (e.g., by introduction of the fluff transfer gas into hydrocarbon recovery system 1 via purge column fluff transfer gas inlet line 61A). In such embodiments, a first portion of the transfer gas in transfer gas outlet line 61 is introduced via first portion fluff transfer blower outlet line 61A into purge column 20 (e.g., via purge column fluff transfer gas inlet 23F), while a remainder or second portion of the fluff transfer gas in transfer gas outlet line 61 in second portion fluff transfer blower outlet line 61B continues to circulate around the fluff transfer loop 68. In embodiments, first portion fluff transfer line 61A introduces from about 0 to about 10, from about 0 to about 25, from about 10 to about 25, from about 25 to about 50, from about 0 to about 50, from about 0 to about 25, from about 10 to about 50, or at least 1, 5, 10, or 50 vol % of the flow of fluff transfer gas in fluff transfer blower outlet line 61 into purge column 20, and the remainder of the fluff transfer gas in fluff transfer blower outlet line 61 continues on via second portion fluff transfer blower outlet line 61B to circulate through loop 68 of fluff transfer system 2. The ratio of purge gas in purge column 20 to circulating gas in fluff transfer system 2 can be from about 10% to about 20%.

As depicted at 330, method 300 can optionally further comprise further integrating the hydrocarbon recovery system 1 and the fluff transfer system 2 by utilizing at least a portion of the recovered purge gas (e.g., in recovered purge gas outlet line 43) from the hydrocarbon recovery system 1 in the fluff transfer system 2 as the fluff transfer gas. For example, as depicted in FIG. 2, second portion recovered purge gas line 43B can carry all or a portion of the purge gas recovered in purge gas-hydrocarbon recovery unit 40 to fluff transfer system 2. Alternatively, all of the purge gas recovered in purge gas-hydrocarbon recovery unit 40 is returned to purge column 20 via first portion recovered purge gas line 43A and/or is otherwise utilized. That is to say, in embodiments, none of the recovered purge gas in recovered purge gas outlet line 43 from purge gas-hydrocarbon recovery unit 40 is introduced into fluff transfer system 2. In embodiments, substantially all of the recovered purge gas from the hydrocarbon recovery system 1 is introduced into the fluff transfer system 2 as the fluff transfer gas. In embodiments, from about 0 to about 100, from about 0 to about 50, from about 50 to about 100, from about 10 to about 100, or at least about 0, 10, 20, 30, 40, 50, 60, 70, 80, 90, or 100 vol % of the flow of recovered purge gas in recovered purge gas outlet line 43 is introduced into fluff transfer system 2 via second portion recovered purge gas line 43B. The remainder of the recovered purge gas in recovered purge gas outlet line 43 can be introduced into purge column 20 via first portion recovered purge gas outlet line 43A, or utilized elsewhere.

Figure 4:
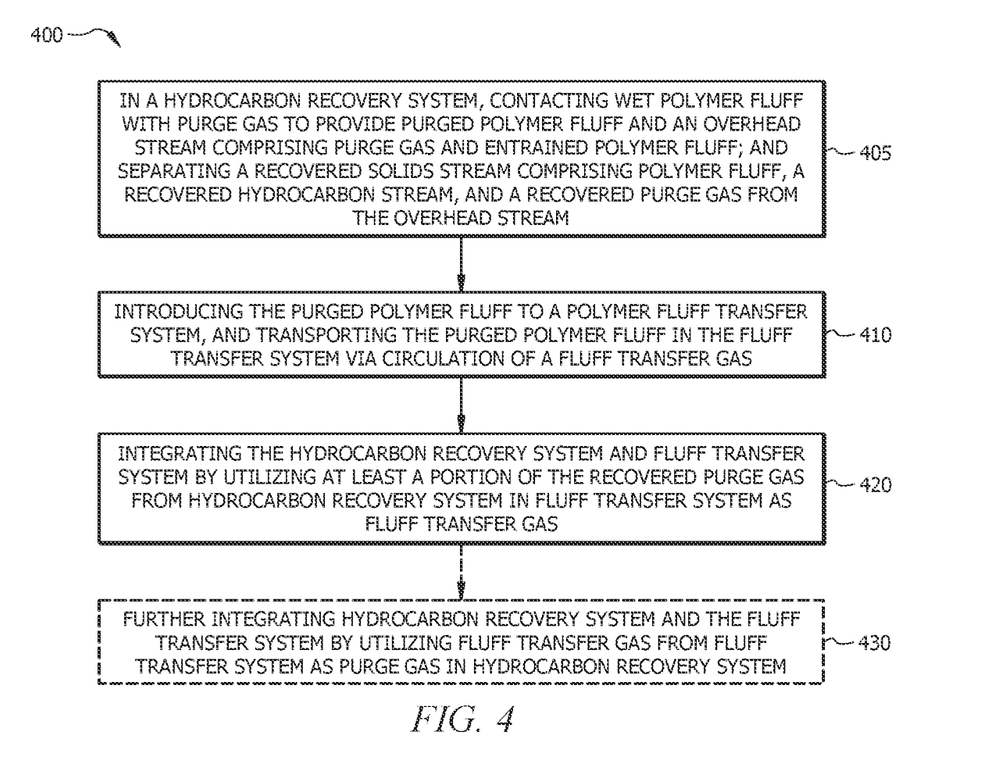
FIG. 4 is a flow diagram of a method, according to embodiments of this disclosure.

With reference now to FIG. 4, in embodiments, a method 400 according to this disclosure comprises: at 405, in a hydrocarbon recovery system 1, contacting wet polymer fluff (e.g., introduced to purge column 20 from upstream apparatus 10 via line 15) with a purge gas to provide a purged polymer fluff and an overhead stream (e.g., in separator inlet line 21) comprising the purge gas and entrained polymer fluff; and separating (e.g., in separator 30 and purge gas-hydrocarbon recovery unit 40) a recovered solids stream (e.g., in separator solids outlet line 32) comprising the previously entrained polymer fluff, a recovered hydrocarbon stream (in recovered hydrocarbons outlet line 42), and a recovered purge gas (e.g., in recovered purge gas outlet line 43) from the overhead stream. Method 400 further comprises, at 410, introducing the purged polymer fluff from purge column 20 to polymer fluff transfer system 2 (e.g., via purge column fluff outlet line 22, rotary valve 50, and rotary valve fluff outlet line 22'), and transporting the purged polymer fluff in the fluff transfer system 2 via circulation of a fluff transfer gas.

Method 400 further comprises, at 420, integrating hydrocarbon recovery system 1 and fluff transfer system 2 by utilizing at least a portion of the recovered purge gas from the hydrocarbon recovery system 1 in fluff transfer system 2 as the fluff transfer gas. For example, as noted above with respect to optional step 330 of the method of FIG. 3, all or a portion of the recovered purge gas in recovered purge gas line 43 can be introduced into fluff transfer system 2 via second portion recovered purge gas line 43B, with a remainder of the recovered purge gas in recovered purge gas line 43A being introduced into purge column 20 via first portion recovered purge gas line 43A or elsewhere. In embodiments, substantially all of the recovered purge gas from the hydrocarbon recovery system 1 is utilized in fluff transfer system 2 as the fluff transfer gas. As noted hereinabove with regard to method 300 of FIG. 3, in embodiments, method 400 can comprise introducing from about 0 to about 100, from about 0 to about 50, from about 50 to about 100, from about 10 to about 100, or at least about 0, 10, 20, 30, 40, 50, 60, 70, 80, 90, or 100 vol % of the flow of recovered purge gas in recovered purge gas outlet line 43 into fluff transfer system 2 via second portion recovered purge gas line 43B. The remainder of the recovered purge gas in recovered purge gas outlet line 43 can be introduced into purge column 20 via first portion recovered purge gas outlet line 43A, or utilized elsewhere.

As depicted at 430 of FIG. 4, method 400 can optionally further comprise further integrating hydrocarbon recovery system 1 and fluff transfer system 2 by utilizing fluff transfer gas from fluff transfer system 2 as the purge gas in the hydrocarbon recovery system 1. In embodiments, first portion fluff transfer line 61A introduces from about 0 to about 10, from about 0 to about 25, from about 10 to about 25, from about 25 to about 50, from about 0 to about 50, from about 0 to about 25, from about 10 to about 50, or at least 1, 5, 10, or 50 vol % of the flow of fluff transfer gas in fluff transfer blower outlet line 61 into purge column 20, and the remainder (if any) of the fluff transfer gas in fluff transfer blower outlet line 61 continues on via second portion fluff transfer blower outlet line 61B to circulate through loop 68 of fluff transfer system 2.

The method of this disclosure (e.g., method 300, method 400) can comprise extracting no gas from the fluff transfer system 2 other than any fluff transfer gas from the fluff transfer system 2 utilized as the purge gas in the hydrocarbon recovery system 1.

As described hereinabove with regard to FIG. 2, the (fresh/make-up) purge gas can comprise nitrogen, alone or in combination with other gas(es). The hydrocarbon recovered via hydrocarbon recovery system 1 can comprise isobutane, alone or in combination with other hydrocarbons.

Method 300/400 can further comprise introducing fresh purge gas into hydrocarbon recovery system 1, introducing fresh fluff transfer gas into the fluff transfer system 2, or both introducing fresh purge gas into hydrocarbon recovery system 1 and introducing fresh fluff transfer gas into the fluff transfer system 2. As noted hereinabove with regard to FIG. 2, fresh purge gas can be introduced into integrated hydrocarbon recovery and fluff transfer system II via a make-up/fresh purge gas line 25A and purge column fresh purge gas inlet 23E, or via fresh/make-up transfer gas line 25B. Because hydrocarbon recovery system 1 and fluff transfer system 2 are integrated via the system and method of this disclosure, fresh/make-up purge gas (which can be the same gas as the transfer gas or contain the same primary component(s)) can be introduced directly into hydrocarbon recovery system 1, for example via fresh/make-up purge gas line 23A, and/or can be introduced via fluff transfer system 2, whereby it can be transferred to purge column 20 via purge column fluff transfer gas inlet line 61A. Similarly, fresh/make-up fluff transfer gas can be introduced directly into fluff transfer system 2, for example, via fresh/make-up fluff transfer gas inlet line 23B, and/or can be introduced into fluff transfer system 2 via hydrocarbon recovery system 1, for example, via second portion recovered purge gas outlet line 43B. Due to pressure considerations (e.g., fluff transfer system 2 operating at a higher pressure than hydrocarbon recovery system 1), second portion recovered purge gas outlet line 43B can introduce recovered purge gas into fluff transfer system 2 downstream of extruder feed tank 70 and/or fluff silo 80, in embodiments. Similarly, due to the pressure considerations, purge column fluff transfer gas inlet line 61A can introduce circulating fluff transfer gas from circulation loop 68 downstream of fluff transfer blower 60 (e.g., from fluff transfer blower outlet line 61). For example, in embodiments, hydrocarbon recovery system 1 (e.g., purge column 20) can be operated at pressures in a range of from about 0.0 to about 0.03 MPa(g), from about 0.03 to about 0.06 MPa(g), from about 0.06 to about 0.1 MPa(g), from about 0.03 to about 0.1 MPa(g), or from about 0.06 to about 0.1 MPa(g). Purge gas-hydrocarbon recovery unit 40, and recovered purge gas outlet line 43, can, in embodiments, be operated at a higher pressure (e.g., 0.3 MPa(g)) than purge column 20. In embodiments, fluff transfer system 2 can be operated at pressures in a range of from about 0.01 to about 0.03 MPa(g), from about 0.03 to about 0.15 MPa(g), from about 0.15 to about 0.5 MPa(g), from about 0.01 to about 0.5 MPa(g), from about 0.03 to about 0.5 MPa(g), or from about 0.15 to about 0.5 MPa(g).

As noted above, the fresh/make-up gas (e.g., nitrogen) can be introduced to the system II at different points. For example, in embodiments, fresh make-up gas can be introduced into purge column 20 via fresh/make-up purge gas line 23A. Alternatively or additionally, the fresh/make-up gas can be introduced directly into fluff transfer system 2, for example, via fresh/make-up fluff transfer gas line 23B. The fluff transfer gas stream from fluff transfer system 2 to hydrocarbon recovery system 1 (e.g., to purge column 20) can be provided from different points on the transfer loop 68. It also can be provided at rotary valve 50. The optimized location can depend on the flow rates and performance of purge gas-hydrocarbon recovery unit 40 (e.g., INRU) and can be determined by one of skill in the art and with the help of this disclosure during the design.

A method of this disclosure can further comprise producing the wet polymer fluff introduced into purge column 20 (e.g., via purge column fluff inlet line 15). The wet polymer fluff can be produced via any suitable methods. For example, in embodiments, the wet polymer fluff comprises a wet PE fluff produced via a slurry loop process. Such a slurry loop process is described, for example, in U.S. Pat. Nos. 9,610,558; 7,033,545; and 6,953,553, the disclosure of each of which is hereby incorporated herein in its entirety for purposes not contrary to this disclosure.

The fluff transfer system 2 can transfer the purged polymer fluff to downstream apparatus 90. For example, in embodiments, downstream apparatus 90 comprises an extruder, and method 300/400 further comprises introducing purged polymer fluff to the extruder via polymer transfer system 2.

The system and method of this disclosure may provide a number of benefits relative to conventional systems and methods. Without limitation, a number of potential advantages will be outlined hereinbelow.

Hydrocarbon content in the fluff transfer system 2 is conventionally controlled by a continuous purge to flare (e.g., via fluff transfer system purge line 92 of non-integrated hydrocarbon recovery and fluff transfer system I of FIG. 1), and, additionally, as noted hereinabove, undesired leaking of gas from fluff transfer system 2 to purge column 1 via rotary valve 50 is a challenging problem in non-integrated hydrocarbon recovery and fluff transfer system systems, such as depicted in FIG. 1. The integrated hydrocarbon recovery and fluff transfer system II of this disclosure and methods 300/400 utilize this gas as the purge gas in purge column 20.

Via this disclosure, hydrocarbon recovery system 1 and fluff transfer loop 68/fluff transfer system 2 are integrated to interconnect the two systems and eliminate hydrocarbon emissions from fluff transfer system 2. In the integrated system II, recovered purge gas (e.g., nitrogen) from the purge gas-hydrocarbon recovery unit 40 (e.g., an INRU) can be utilized as the make-up nitrogen to the fluff transfer system 2. Via this disclosure, the gas conventionally purged via fluff transfer purge gas outlet line 92 of a non-integrated hydrocarbon recovery and fluff transfer, such as system I of FIG. 1, to flare from the fluff transfer system 2 can be sent to the purge column 20 and there be utilized as purge gas. An amount of fresh gas (e.g., purge gas, transfer gas (e.g., nitrogen)) equivalent to an amount of waste gas removed from the purge gas-hydrocarbon recovery unit 40 (e.g., INRU) via waste gas outlet line 41 (FIG. 2) can be added to the system II either at the fluff transfer loop 68 (e.g., via fresh/make-up line 25B) or at the bottom of the purge column 20 (e.g., via purge column fluff transfer gas inlet line 61A) as make-up. In embodiments, second portion recovered purge gas outlet line 43B can be 0-100 vol % of the purge gas (e.g., nitrogen) recovered in recovered purge gas outlet line 43 via purge gas-hydrocarbon recovery unit 40 (e.g., INRU). The flow rate of make-up/fresh gas to fluff transfer system 2 via make-up/fresh transfer gas line 23B can be 0-100% of the flow rate of purge column fluff transfer gas inlet line 61A to purge column 20.

The disclosed system II and method 300/400 eliminate the need for a direct purge to flare from the fluff transfer system 2. Accordingly, the disclosed system II and method 300/400 allow for reduced gas (e.g., nitrogen) consumption and hydrocarbon waste in the system. By eliminating the need for flaring a low hydrocarbon content stream, the need for fuel gas for such flaring is also obviated. The disclosed system II and method 300/400 enable a substantially emissions free fluff transfer system 2, which reduces purge/transfer gas (e.g., nitrogen) consumption and hydrocarbon emission and waste.

Other advantages will be apparent to those of skill in the art and with the help of this disclosure.

EXAMPLES

The embodiments having been generally described, the following examples are given as particular examples to demonstrate the practice and advantages of this disclosure. It is understood that the examples are given by way of illustration and are not intended to limit the specification or the claims in any manner.

Comparative Example 1 and Example 2 described here are included to demonstrate the advantages of a hydrocarbon recovery system 1 integrated with a fluff transfer system 2 of FIG. 2 (discussed in Example 2) relative to a non-integrated hydrocarbon recovery and fluff transfer system, such as system I of FIG. 1 (discussed in Comparative Example 1).

Comparative Example 1

For a non-integrated hydrocarbon recovery and fluff transfer system and process scheme, such as system I illustrated in FIG. 1, for a certain amount of PE production, 1500 kg/h of purge gas is fed to purge column 20 to separate the hydrocarbons from the polymer fluff. This purge gas can be provided by streams 32 (1250 kg/h) and 25A (250 kg/h). An additional 200 kg/h gas from fluff transfer system 2 can leak through the rotary valve 50 to the purge column 20. An amount of 450 kg/h of gas stream is removed from system I via waste gas outlet line 41 to facilitate the separation in purge gas-hydrocarbon recovery unit 40 (e.g., (e.g., an INRU) and maintain the system I at steady state operation.

Fluff transfer system 2 releases 750 kg/h of transfer gas (e.g., to flare) via fluff transfer purge gas outlet line 92, in order to avoid accumulation of hydrocarbon in the system I. An amount of 950 kg/h of fresh gas is introduced via fresh fluff transfer gas inlet line 25B to make up losses via fluff transfer purge gas outlet line 92 and rotary valve 50.

Accordingly, the process scheme of this Comparative Example 1 results in a loss of 1200 kg/h of purge gas (e.g., in waste gas outlet line 41 and fluff transfer purge gas outlet line 92) and releases, depending on the hydrocarbon concentration in fluff transfer system 2, from about 1 to 2 kg/h VOCs (e.g., via fluff transfer purge gas outlet line 92). If the contents of fluff transfer purge gas outlet line 92 is sent to a flare, additional fuel gas is added thereto to provide the required heating value by a flare system.

Example 2

For a process scheme of this disclosure, such as integrated hydrocarbon recovery and fluff transfer system II depicted and described with reference to FIG. 2 is utilized rather than the non-integrated hydrocarbon recovery and fluff transfer system I and process scheme described hereinabove in Comparative Example 1, and keeping operating parameters the same, the stream in second portion recovered purge gas outlet line 43B provides the makeup transfer gas for fluff transfer system 2. The introduction of fluff transfer gas into purge column 20 via purge column fluff transfer gas inlet line 61A maintains a low hydrocarbons concentration in the fluff transfer system 2, while providing purging gas to purge column 20.

The process scheme of this Example 2 according to this disclosure limits the purge/transfer gas losses to those in waste gas outlet line 41 (e.g., fluff transfer system 2 does not release gas via a fluff transfer purge gas outlet line 92, as system II does not utilize/comprise a fluff transfer purge gas outlet line 92). Losses of the process of this Example 2 will be determined based on process requirements and can be between 250 kg/h (stream 25A makeup dictated by purge column 20 requirements) and 450 kg/h (stream in waste gas outlet line 41 loss dictated by the requirements of purge gas-hydrocarbon recovery unit 40 (e.g., (e.g., an INRU). The process of this Example 2 does not include any VOC losses from fluff transfer system 2.

ADDITIONAL DESCRIPTION

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having," "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents, the definitions that are consistent with this specification should be adopted.

The following are non-limiting, specific embodiments in accordance with the present disclosure:

In a first embodiment, a system (II) comprises: a hydrocarbon recovery system (1) integrated with a fluff transfer system (2), wherein the hydrocarbon recovery system (1) comprises: a purge column (20), a separator (30), a purge gas-hydrocarbon recovery unit (40), and a waste gas outlet line (41); wherein the purge column (20) is configured for contact of wet polymer fluff with a purge gas, and comprises a wet polymer fluff inlet (23A), a gas outlet (23B), a fluff outlet (23G) and one or more purge gas inlets (23D, 23E, 23F) for the purge gas, wherein the separator (30) is fluidly connected with the gas outlet (23B) of the purge column (20) and is configured to separate solids comprising recovered polymer fluff from a separator gas outlet stream (31) comprising the purge gas and hydrocarbon, and wherein the purge gas-hydrocarbon recovery unit (40) is fluidly connected with the separator (30) and is configured to separate the separator gas outlet stream (31) into a recovered hydrocarbon stream (42) and a recovered purge gas stream (43), wherein the fluff transfer system (2) comprises: a fluff transfer blower (60) configured to pressurize a fluff transfer gas and provide a pressurized fluff transfer gas in a fluff transfer blower outlet line (61), and an extruder feed tank (70) fluidly connected with the fluff transfer blower (60) via the fluff transfer blower outlet line (61) and fluidly connected with the purge column (20) via the fluff outlet (23G), a purge column fluff outlet line (22), and a rotary valve (50), wherein the extruder feed tank (70) comprises an extruder feed tank fluff outlet line (71) and an extruder feed tank fluff transfer gas outlet line (72), wherein the extruder feed tank fluff transfer gas outlet line (72) is fluidly connected with the fluff transfer blower (60) via a fluff transfer gas circulation line (63), wherein the hydrocarbon recovery system (1) is integrated with the fluff transfer system (2) via a purge column fluff transfer gas inlet line (61A) fluidly connecting at least one of the one or more purge gas inlets (23D, 23E, 23F) of the purge column (20) with the fluff transfer blower outlet line (61), whereby a portion of the fluff transfer gas in the fluff transfer blower outlet line (61) is introduced into the purge column (20) as at least a portion of the purge gas.

A second embodiment can include the system of the first embodiment, wherein the hydrocarbon recovery system (1) is further integrated with the fluff transfer system (2) via a fluff transfer system recovered purge gas line (43B) fluidly connecting the purge gas-hydrocarbon recovery unit (40) with the fluff transfer system (2), whereby at least a portion of the recovered purge gas in the recovered purge gas stream (43) can be introduced into the fluff transfer system (2) as the fluff transfer gas.

A third embodiment can include the system of any one of the first or second embodiments, wherein the waste gas outlet line (41) is connected to the purge gas-hydrocarbon recovery unit (40).

A fourth embodiment can include the system of any one of the first to third embodiments, wherein there is no gas outlet line from the fluff transfer system (2) other than the purge column fluff transfer gas inlet line (61A).

A fifth embodiment can include the system of any one of the first to fourth embodiments, wherein the purge gas comprises nitrogen, wherein the hydrocarbon comprises isobutane, or both wherein the purge gas comprises nitrogen and the hydrocarbon comprises isobutane.

A sixth embodiment can include the system of any one of the first to fifth embodiments further comprising one or more fresh purge or fluff transfer gas inlet lines.

A seventh embodiment can include the system of the sixth embodiment, comprising a fresh purge gas inlet line (25A) fluidly connected with the purge column 20 via at least one of the one or more purge gas inlets (23D, 23E, 23F).

An eighth embodiment can include the system of any one of the sixth or seventh embodiments, comprising a fresh fluff transfer gas inlet line (25B) fluidly connected with the fluff transfer system (2).

A ninth embodiment can include the system of the eighth embodiment, wherein the fresh fluff transfer gas inlet line (25B) is fluidly connected with the fluff transfer gas circulation line (63).

A tenth embodiment can include the system of any one of the first to ninth embodiments further comprising upstream apparatus (10) operable to provide the wet polymer fluff to the purge column (20).

An eleventh embodiment can include the system of the tenth embodiment, wherein the upstream apparatus (10) comprises one or more polymerization reactors, one or more systems, or a combination thereof.

A twelfth embodiment can include the system of any one of the first to eleventh embodiments further comprising downstream apparatus (90).

A thirteenth embodiment can include the system of the twelfth embodiment, wherein the downstream apparatus (90) comprises an extruder.

In a fourteenth embodiment, a system (II) comprises: a hydrocarbon recovery system (1) integrated with a fluff transfer system (2), wherein the hydrocarbon recovery system (1) comprises: a purge column (20), a separator (30), a purge gas-hydrocarbon recovery unit (40), and a waste gas outlet line (41); wherein the purge column (20) is configured for contact of wet polymer fluff with a purge gas, and comprises a wet polymer fluff inlet (23A), a gas outlet (23B) a fluff outlet (23G) and one or more purge gas inlets (23D, 23E, 23F) for the purge gas, wherein the separator (30) is fluidly connected with the gas outlet (23B) of the purge column (20) and is configured to separate solids comprising recovered polymer fluff from a separator gas outlet stream (31) comprising the purge gas and hydrocarbon, and wherein the purge gas-hydrocarbon recovery unit (40) is fluidly connected with the separator (30) and is configured to separate the separator gas outlet stream (31) into a recovered hydrocarbon stream (42) and a recovered purge gas stream (43), wherein the fluff transfer system (2) comprises: a fluff transfer blower (60) configured to pressurize a fluff transfer gas and provide a pressurized fluff transfer gas in a fluff transfer blower outlet line (61), and an extruder feed tank (70) fluidly connected with the fluff transfer blower (60) via the fluff transfer blower outlet line (61) and fluidly connected with the purge column (20) via the fluff outlet (23G), a purge column fluff outlet line (22), and a rotary valve (50), wherein the extruder feed tank (70) comprises an extruder feed tank fluff outlet line (71) and an extruder feed tank fluff transfer gas outlet line (72), wherein the extruder feed tank fluff transfer gas outlet line (72) is fluidly connected with the fluff transfer blower (60) via a fluff transfer gas circulation line (63), wherein the hydrocarbon recovery system (1) is integrated with the fluff transfer system (2) via a fluff transfer system recovered purge gas line (43B) fluidly connecting the recovered purge gas-hydrocarbon recovery unit (40) with the fluff transfer system (2), whereby at least a portion of the recovered purge gas in the recovered purge gas stream (43) can be introduced into the fluff transfer system (2) as the fluff transfer gas.

A fifteenth embodiment can include the system of the fourteenth embodiment, wherein the hydrocarbon recovery system (1) is further integrated with the fluff transfer system (2) via a purge column fluff transfer gas inlet line (61A) fluidly connecting at least one of the one or more purge gas inlets (23D, 23E, 23F) of the purge column (20) with the fluff transfer blower outlet line (61), whereby a portion of the fluff transfer gas in the fluff transfer blower outlet line (61) can be introduced into the purge column (20) as at least a portion of the purge gas.

A sixteenth embodiment can include the system of any one of the fourteenth or fifteenth embodiments, wherein there is no gas outlet line from the fluff transfer system (2) other than the purge column fluff transfer gas inlet line (61A).

A seventeenth embodiment can include the system of any one of the fourteenth to sixteenth embodiments, wherein the waste gas outlet line (41) is connected to the purge gas-hydrocarbon recovery unit (40).

An eighteenth embodiment can include the system of any one of the fourteenth to seventeenth embodiments, wherein the purge gas comprises nitrogen, wherein the hydrocarbon comprises isobutane, or both wherein the purge gas comprises nitrogen and the hydrocarbon comprises isobutane.

A nineteenth embodiment can include the system of any one of the fourteenth to eighteenth embodiments further comprising one or more fresh purge or fluff transfer gas inlet lines.

A twentieth embodiment can include the system of the nineteenth embodiment, comprising a fresh purge gas inlet line (25A) fluidly connected with the purge column 20 via at least one of the one or more purge gas inlets (23D, 23E, 23F).

A twenty first embodiment can include the system of any one of the nineteenth to twentieth embodiments, comprising a fresh fluff transfer gas inlet line (25B) fluidly connected with the fluff transfer system (2).

A twenty second embodiment can include the system of the twenty first embodiment, wherein the fresh fluff transfer gas inlet line (25B) is fluidly connected with the fluff transfer gas circulation line (63).

A twenty third embodiment can include the system of any one of the fourteenth to twenty second embodiments further comprising upstream apparatus (10) operable to provide the wet polymer fluff to the purge column (20).

A twenty fourth embodiment can include the system of the twenty third embodiment, wherein the upstream apparatus (10) comprises one or more polymerization reactors, one or more flash systems, or a combination thereof.

A twenty fifth embodiment can include the system of any one of the fourteenth to twenty fourth embodiments further comprising downstream apparatus (90).

A twenty sixth embodiment can include the system of the twenty fifth embodiment, wherein the downstream apparatus (90) comprises an extruder.

In a twenty seventh embodiment, a method comprises: in a hydrocarbon recovery system (1), contacting wet polymer fluff with a purge gas to provide a purged polymer fluff and an overhead stream comprising the purge gas and entrained polymer fluff; and separating a recovered solids stream comprising the entrained polymer fluff, a recovered hydrocarbon stream, and a recovered purge gas from the overhead stream; introducing the purged polymer fluff to a polymer fluff transfer system (2), and transporting the purged polymer fluff in the fluff transfer system (2) via circulation of a fluff transfer gas; and integrating the hydrocarbon recovery system (1) and the fluff transfer system (2) by utilizing fluff transfer gas from the fluff transfer system (2) as the purge gas in the hydrocarbon recovery system (1).

A twenty eighth embodiment can include the method of the twenty seventh embodiment, comprising further integrating the hydrocarbon recovery system (1) and the fluff transfer system (2) by utilizing at least a portion of the recovered purge gas from the hydrocarbon recovery system (1) in the fluff transfer system (2) as the fluff transfer gas.

A twenty ninth embodiment can include the method of any one of the twenty seventh or eighth embodiments, comprising utilizing substantially all of the recovered purge gas from the hydrocarbon recovery system (1) in the fluff transfer system (2) as the fluff transfer gas.

A thirtieth embodiment can include the method of the twenty ninth embodiment further comprising extracting no gas from the fluff transfer system (2) other than the fluff transfer gas from the fluff transfer system (2) utilized as the purge gas in the hydrocarbon recovery system (1).

A thirty first embodiment can include the method of any one of the twenty seventh to thirtieth embodiments, wherein the purge gas comprises nitrogen, wherein the hydrocarbon comprises isobutane, or both wherein the purge gas comprises nitrogen and the hydrocarbon comprises isobutane.

A thirty second embodiment can include the method of any one of the twenty seventh to thirty first embodiments further comprising introducing fresh purge gas into the hydrocarbon recovery system (1), introducing fresh fluff transfer gas into the fluff transfer system (2), or both introducing fresh purge gas into the hydrocarbon recovery system (1) and introducing fresh fluff transfer gas into the fluff transfer system (2).

A thirty third embodiment can include the method of any one of the twenty seventh to thirty second embodiments further comprising producing the wet polymer fluff.

A thirty fourth embodiment can include the method of any one of the twenty seventh to thirty third embodiments, wherein the polymer transfer system (2) transfers the purged polymer fluff into an extruder.

In a thirty fifth embodiment, a method comprises: in a hydrocarbon recovery system (1), contacting wet polymer fluff with a purge gas to provide a purged polymer fluff and an overhead stream comprising the purge gas and entrained polymer fluff; and separating a recovered solids stream comprising the entrained polymer fluff, a recovered hydrocarbon stream, and a recovered purge gas from the overhead stream; introducing the purged polymer fluff to a polymer fluff transfer system (2), and transporting the purged polymer fluff in the fluff transfer system (2) via circulation of a fluff transfer gas; and integrating the hydrocarbon recovery system (1) and the fluff transfer system (2) by utilizing at least a portion of the recovered purge gas from the hydrocarbon recovery system (1) in the fluff transfer system (2) as the fluff transfer gas.

A thirty sixth embodiment can include the method of the thirty fifth embodiment comprising further integrating the hydrocarbon recovery system (1) and the fluff transfer system (2) by utilizing fluff transfer gas from the fluff transfer system (2) as the purge gas in the hydrocarbon recovery system (1).

A thirty seventh embodiment can include the method of the thirty sixth embodiment, comprising utilizing substantially all of the recovered purge gas from the hydrocarbon recovery system (1) in the fluff transfer system (2) as the fluff transfer gas.

A thirty eighth embodiment can include the method of any one of the thirty fifth to thirty seventh embodiments further comprising extracting no gas from the fluff transfer system (2) other than the fluff transfer gas from the fluff transfer system (2) utilized as the purge gas in the hydrocarbon recovery system (1).

A thirty ninth embodiment can include the method of any one of the thirty fifth to thirty eighth embodiments, wherein the purge gas comprises nitrogen, wherein the hydrocarbon comprises isobutane, or both wherein the purge gas comprises nitrogen and the hydrocarbon comprises isobutane.

A fortieth embodiment can include the method of any one of the thirty fifth to thirty ninth embodiments further comprising introducing fresh purge gas into the hydrocarbon recovery system (1), introducing fresh fluff transfer gas into the fluff transfer system (2), or both introducing fresh purge gas into the hydrocarbon recovery system (1) and introducing fresh fluff transfer gas into the fluff transfer system (2).

A forty first embodiment can include the method of any one of the thirty fifth to fortieth embodiments further comprising producing the wet polymer fluff.

A forty second embodiment can include the method of any one of the thirty fifth to forty first embodiments, wherein the polymer transfer system (2) transfers the purged polymer fluff into an extruder.

In a forty third embodiment, a hydrocarbon recovery system comprises: a purge column; a separator; a purge gas-hydrocarbon recovery unit; and a waste gas outlet line: wherein the purge column is configured for contact of wet polymer fluff with a purge gas, and comprises a wet polymer fluff inlet, a gas outlet for an overhead stream comprising the purge gas and entrained polymer fluff, a fluff outlet for a purged polymer fluff, and one or more purge gas inlets for the purge gas, wherein the separator is fluidly connected with the gas outlet of the purge column and is configured to separate solids comprising recovered polymer fluff from a separator gas outlet stream comprising the purge gas and hydrocarbon, and wherein the purge gas-hydrocarbon recovery unit is fluidly connected with the separator and is configured to separate the separator gas outlet stream into a recovered hydrocarbon stream and a recovered purge gas stream, wherein the hydrocarbon recovery system is integrated with a fluff transfer system configured for transporting the purged polymer fluff via circulation of a fluff transfer gas, (a) wherein the hydrocarbon recovery system is integrated with the fluff transfer system such that a portion of the fluff transfer gas in the fluff transfer system is introduced into the purge column as at least a portion of the purge gas, and/or (b) wherein the hydrocarbon recovery system is integrated with the fluff transfer system such that at least a portion of the recovered purge gas in the recovered purge gas stream is introduced into the fluff transfer system as the fluff transfer gas.

A forty fourth embodiment can include the hydrocarbon recovery system of the forty third embodiment, comprising (a) wherein the hydrocarbon recovery system is integrated with the fluff transfer system such that the portion of the fluff transfer gas in the fluff transfer system is introduced into the purge column as the at least the portion of the purge gas.

A forty fifth embodiment can include the hydrocarbon recovery system of the forty fourth embodiment further comprising (b) wherein the hydrocarbon recovery system is further integrated with the fluff transfer system such that the at least the portion of the recovered purge gas in the recovered purge gas stream is introduced into the fluff transfer system as the fluff transfer gas.

A forty sixth embodiment can include the hydrocarbon recovery system of the forty fourth or forty fifth embodiment, wherein the waste gas outlet line is connected to the purge gas-hydrocarbon recovery unit.

A forty seventh embodiment can include the hydrocarbon recovery system of any one of the forty fourth to forty sixth embodiments, wherein there is no gas outlet from the fluff transfer system other than an outlet for the fluff transfer gas in the fluff transfer system that is introduced into the purge column as the at least the portion of the purge gas.

A forty eighth embodiment can include the hydrocarbon recovery system of any one of the forty fourth to forty seventh embodiments, wherein the purge gas comprises nitrogen, wherein the hydrocarbon comprises isobutane, or both wherein the purge gas comprises nitrogen and the hydrocarbon comprises isobutane.

A forty ninth embodiment can include the hydrocarbon recovery system of the forty third embodiment comprising (b) wherein the hydrocarbon recovery system is integrated with the fluff transfer system such that the at least the portion of the recovered purge gas in the recovered purge gas stream is introduced into the fluff transfer system as the fluff transfer gas.

A fiftieth embodiment can include the hydrocarbon recovery system of the forty ninth embodiment further comprising (a) wherein the hydrocarbon recovery system is integrated with the fluff transfer system such that the portion of the fluff transfer gas in the fluff transfer system is introduced into the purge column as the at least the portion of the purge gas.

A fifty first embodiment can include the hydrocarbon recovery system of the fiftieth embodiment, wherein there is no gas outlet from the fluff transfer system other than an outlet for the fluff transfer gas in the fluff transfer system that is introduced into the purge column as the at least the portion of the purge gas.

A fifty second embodiment can include the hydrocarbon recovery system of any one of the forty ninth to fifty first embodiments, wherein the waste gas outlet line is connected to the purge gas-hydrocarbon recovery unit.

A fifty third embodiment can include the hydrocarbon recovery system of any one of the forty ninth to fifty second embodiments, wherein the purge gas comprises nitrogen, wherein the hydrocarbon comprises isobutane, or both wherein the purge gas comprises nitrogen and the hydrocarbon comprises isobutane.

A fifty fourth embodiment can include the hydrocarbon recovery system of any one of the forty third to fifty third embodiments, further comprising one or more fresh purge gas inlet lines.

In a fifty fifth embodiment, a fluff transfer system configured for transporting a purged polymer fluff from a purge column via circulation of a fluff transfer gas comprises: a fluff transfer blower configured to pressurize the fluff transfer gas and provide a pressurized fluff transfer gas in a fluff transfer blower outlet line, and an extruder feed tank fluidly connected with the fluff transfer blower via the fluff transfer blower outlet line and fluidly connected with the purge column via the fluff outlet, wherein the extruder feed tank comprises an extruder feed tank fluff outlet line and an extruder feed tank fluff transfer gas outlet line, wherein the extruder feed tank fluff transfer gas outlet line is fluidly connected with the fluff transfer blower via a fluff transfer gas circulation line, wherein the fluff transfer system is integrated with a hydrocarbon recovery system, wherein the hydrocarbon recovery system comprises the purge column and is configured for contact of wet polymer fluff with the purge gas to provide the purged polymer fluff, (a) wherein the fluff transfer system is integrated with the hydrocarbon recovery system such that at least a portion of a recovered purge gas from the hydrocarbon recovery system is introduced into the fluff transfer system as the fluff transfer gas; and/or (b) wherein the fluff transfer system is integrated with the hydrocarbon recovery system such that a portion of the fluff transfer gas is introduced into the purge column as at least a portion of the purge gas.

A fifty sixth embodiment can include the fluff transfer system of claim the fifty fifth embodiment, comprising (a) wherein the fluff transfer system is integrated with the hydrocarbon recovery system such that the at least the portion of the recovered purge gas from the hydrocarbon recovery system is introduced into the fluff transfer system as the fluff transfer gas.

A fifty seventh embodiment can include the fluff transfer system of the fifty sixth embodiment further comprising (b) wherein the fluff transfer system is integrated with the hydrocarbon recovery system such that the portion of the fluff transfer gas is introduced into the purge column as the at least the portion of the purge gas.

A fifty eighth embodiment can include the fluff transfer system of the fifty seventh embodiment, wherein there is no gas outlet line from the fluff transfer system other than a line via which the portion of the fluff transfer gas is introduced into the purge column as the at least the portion of the purge gas.

A fifty ninth embodiment can include the fluff transfer system of the fifty fifth embodiment comprising (b) wherein the fluff transfer system is integrated with the hydrocarbon recovery system such that the portion of the fluff transfer gas in the fluff transfer blower outlet line is introduced into the purge column as the at least the portion of the purge gas.

A sixtieth embodiment can include the fluff transfer system of the fifty ninth embodiment further comprising (a) wherein the fluff transfer system is further integrated with the hydrocarbon recovery system such that the at least the portion of the recovered purge gas is introduced into the fluff transfer system as the fluff transfer gas.

A sixty first embodiment can include the fluff transfer system of the fifty ninth or sixtieth embodiment, wherein there is no gas outlet line from the fluff transfer system other than a line via which the portion of the fluff transfer gas in the fluff transfer blower outlet line is introduced into the purge column as the at least the portion of the purge gas.

A sixty second embodiment can include the fluff transfer system of any one of the fifty fifth to sixty first embodiments further comprising one or more fresh fluff transfer gas inlet lines.

In a sixty third embodiment, a hydrocarbon recovery system is integrated with a fluff transfer system, wherein the hydrocarbon recovery system is configured for contacting a wet polymer fluff with a purge gas to provide a purged polymer fluff and an overhead stream comprising the purge gas and entrained polymer fluff; and separating a recovered solids stream comprising the entrained polymer fluff, a recovered hydrocarbon stream, and a recovered purge gas from the overhead stream; wherein the polymer fluff transfer system is configured to receive the purged polymer fluff from the hydrocarbon recovery system and transport the purged polymer fluff in the fluff transfer system via circulation of a fluff transfer gas; and (a) wherein the hydrocarbon recovery system and the fluff transfer system are integrated by utilizing fluff transfer gas from the fluff transfer system as the purge gas in the hydrocarbon recovery system; and/or (b) wherein the hydrocarbon recovery system and the fluff transfer system are integrated by utilizing at least a portion of the recovered purge gas from the hydrocarbon recovery system in the fluff transfer system as the fluff transfer gas.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:
1. A hydrocarbon recovery system comprising:
 a purge column;
 a separator;
 a purge gas-hydrocarbon recovery unit; and
 a waste gas outlet line,
  wherein the purge column is configured for contact of wet polymer fluff with a purge gas, and comprises a wet polymer fluff inlet, a gas outlet for an overhead stream comprising the purge gas and entrained polymer fluff, a fluff outlet for a purged polymer fluff, and one or more purge gas inlets for the purge gas,
  wherein the separator is fluidly connected with the gas outlet of the purge column and is configured to separate solids comprising recovered polymer fluff from a separator gas outlet stream comprising the purge gas and hydrocarbon,
  wherein the purge gas-hydrocarbon recovery unit is fluidly connected with the separator and is config- ured to separate the separator gas outlet stream into a recovered hydrocarbon stream and a recovered purge gas stream,
wherein the hydrocarbon recovery system is integrated with a fluff transfer system configured for transporting the purged polymer fluff via circulation of a fluff transfer gas,
wherein the hydrocarbon recovery system is integrated with the fluff transfer system such that at least a portion of the recovered purge gas in the recovered purge gas stream is introduced into the fluff transfer system as the fluff transfer gas; and
wherein there is no gas outlet from the fluff transfer system other than an optional outlet for the fluff transfer gas in the fluff transfer system whereby a portion of the fluff transfer gas can be introduced into the purge column as at least a portion of the purge gas.

2. The hydrocarbon recovery system of claim 1, wherein the hydrocarbon recovery system is further integrated with the fluff transfer system such that the portion of the fluff transfer gas in the fluff transfer system is introduced into the purge column as the at least the portion of the purge gas.

3. The hydrocarbon recovery system of claim 1, wherein the waste gas outlet line is connected to the purge gas-hydrocarbon recovery unit.

4. The hydrocarbon recovery system of claim 1, wherein the purge gas comprises nitrogen, wherein the hydrocarbon comprises isobutane, or both wherein the purge gas comprises nitrogen and the hydrocarbon comprises isobutane.

5. The hydrocarbon recovery system of claim 1, further comprising one or more fresh purge or fluff transfer gas inlet lines.

6. The hydrocarbon recovery system of claim 5, comprising a fresh purge gas inlet line fluidly connected with the purge column via at least one of the one or more purge gas inlets.

7. The hydrocarbon recovery system of claim 5, comprising a fresh fluff transfer gas inlet line fluidly connected with the fluff transfer system.

8. The hydrocarbon recovery system of claim 7, wherein the fresh fluff transfer gas inlet line is fluidly connected with the fluff transfer gas circulation line.

9. The hydrocarbon recovery system of claim 1 further comprising upstream apparatus operable to provide the wet polymer fluff to the purge column.

10. The hydrocarbon recovery system of claim 9, wherein the upstream apparatus comprises one or more polymerization reactors.

11. A fluff transfer system configured for transporting a purged polymer fluff from a purge column via circulation of a fluff transfer gas, the fluff transfer system comprising:
a fluff transfer blower configured to pressurize the fluff transfer gas and provide a pressurized fluff transfer gas in a fluff transfer blower outlet line, and
an extruder feed tank fluidly connected with the fluff transfer blower via the fluff transfer blower outlet line and fluidly connected with the purge column via the fluff outlet, wherein the extruder feed tank comprises an extruder feed tank fluff outlet line and an extruder feed tank fluff transfer gas outlet line, wherein the extruder feed tank fluff transfer gas outlet line is fluidly connected with the fluff transfer blower via a fluff transfer gas circulation line,
wherein the fluff transfer system is integrated with a hydrocarbon recovery system, wherein the hydrocarbon recovery system comprises the purge column and is configured for contact of wet polymer fluff with the purge gas to provide the purged polymer fluff, wherein the fluff transfer system is integrated with the hydrocarbon recovery system such that at least a portion of a recovered purge gas from the hydrocarbon recovery system is introduced into the fluff transfer system as the fluff transfer gas, and wherein there is no gas outlet line from the fluff transfer system other than optionally a line via which a portion of the fluff transfer gas can be introduced into the purge column as at least a portion of the purge gas.

12. The fluff transfer system of claim 11, wherein the fluff transfer system is further integrated with the hydrocarbon recovery system such that the portion of the fluff transfer gas is introduced into the purge column as the at least the portion of the purge gas.

13. The fluff transfer system of claim 11, wherein the purge gas comprises nitrogen, wherein the hydrocarbon comprises isobutane, or both wherein the purge gas comprises nitrogen and the hydrocarbon comprises isobutane.

14. The fluff transfer system of claim 11 further comprising one or more fresh fluff transfer gas inlet lines fluidly connected with the fluff transfer system.

15. The fluff transfer system of claim 14, wherein at least one of the one or more fresh fluff transfer gas inlet lines is fluidly connected with the fluff transfer gas circulation line.

16. The fluff transfer system of claim 11 further comprising upstream apparatus operable to provide the wet polymer fluff to the purge column.

17. The fluff transfer system of claim 16, wherein the upstream apparatus comprises one or more polymerization reactors.

18. A hydrocarbon recovery system integrated with a fluff transfer system, wherein the hydrocarbon recovery system is configured for contacting a wet polymer fluff with a purge gas in a purge column to provide a purged polymer fluff and an overhead stream comprising the purge gas and entrained polymer fluff; and separating a recovered solids stream comprising the entrained polymer fluff, a recovered hydrocarbon stream comprising a hydrocarbon, and a recovered purge gas from the overhead stream; wherein the polymer fluff transfer system is configured to receive the purged polymer fluff from the hydrocarbon recovery system and transport the purged polymer fluff in the fluff transfer system via circulation of a fluff transfer gas; and wherein the hydrocarbon recovery system and the fluff transfer system are integrated by utilizing at least a portion of the recovered purge gas from the hydrocarbon recovery system in the fluff transfer system as the fluff transfer gas, wherein there is no gas outlet line from the fluff transfer system other than optionally a line via which a portion of the fluff transfer gas can be introduced into the purge column as at least the portion of the purge gas.

19. The hydrocarbon recovery system of claim 18, wherein the fluff transfer system is further integrated with the hydrocarbon recovery system such that the portion of the fluff transfer gas is introduced into the purge column as the at least the portion of the purge gas.

20. The hydrocarbon recovery system of claim 18, wherein the purge gas comprises nitrogen, wherein the hydrocarbon comprises isobutane, or both wherein the purge gas comprises nitrogen and the hydrocarbon comprises isobutane.

* * * * *